(12) United States Patent  (10) Patent No.: US 8,179,521 B2
Valla et al.  (45) Date of Patent: May 15, 2012

(54) MEASUREMENT OF SPEED OR VIBRATION CHARACTERISTICS USING A LIDAR DEVICE WITH HETERODYNE DETECTION

(75) Inventors: Matthieu Valla, Massy (FR); Claudine Besson, Bures sur Yvette (FR); Beatrice Augere, Palaiseau (FR)

(73) Assignee: Onera, Chatillon (FR)

( * ) Notice: Subject to any disclaimer, the term of this patent is extended or adjusted under 35 U.S.C. 154(b) by 22 days.

(21) Appl. No.: 12/948,073

(22) Filed: Nov. 17, 2010

(65) Prior Publication Data

US 2011/0116074 A1    May 19, 2011

(30) Foreign Application Priority Data

Nov. 18, 2009 (FR) ...................................... 09 58152

(51) Int. Cl.
*G01C 3/08* (2006.01)
(52) U.S. Cl. ...................................................... 356/5.01
(58) Field of Classification Search ................... 356/5.01
See application file for complete search history.

(56) References Cited

U.S. PATENT DOCUMENTS

| | | | | |
|---|---|---|---|---|
| 5,367,371 A * | 11/1994 | Krawczyk | ..................... | 356/28.5 |
| 5,847,816 A * | 12/1998 | Zediker et al. | ................ | 356/5.09 |
| 6,035,710 A * | 3/2000 | Hutchison et al. | ........ | 73/170.16 |
| 6,046,695 A * | 4/2000 | Poehler et al. | .............. | 342/25 A |
| 6,634,600 B2 * | 10/2003 | Krawczyk et al. | ......... | 244/158.4 |
| 7,106,447 B2 * | 9/2006 | Hays | ............................. | 356/450 |
| 7,359,057 B2 * | 4/2008 | Schwiesow | .................... | 356/451 |
| 7,391,506 B2 * | 6/2008 | Harris et al. | ................. | 356/28.5 |
| 7,522,291 B2 * | 4/2009 | Hays et al. | ..................... | 356/519 |
| 7,532,311 B2 * | 5/2009 | Henderson et al. | .......... | 356/4.01 |
| 8,077,294 B1 * | 12/2011 | Grund et al. | ................. | 356/4.01 |
| 2002/0036766 A1 * | 3/2002 | Krawczyk et al. | ........... | 356/28.5 |
| 2003/0160967 A1 * | 8/2003 | Houston et al. | ............... | 356/501 |
| 2003/0219252 A1 * | 11/2003 | Hays | ............................ | 398/118 |
| 2005/0002013 A1 * | 1/2005 | Harris | ........................ | 356/4.1 |
| 2006/0227317 A1 * | 10/2006 | Henderson et al. | ............ | 356/28 |
| 2007/0166049 A1 * | 7/2007 | Pearson et al. | ................ | 398/161 |
| 2007/0171396 A1 * | 7/2007 | Harris et al. | .................... | 356/28 |
| 2007/0229799 A1 * | 10/2007 | Baillon et al. | ............... | 356/28.5 |
| 2010/0070199 A1 * | 3/2010 | Mendenhall et al. | .......... | 702/28 |

FOREIGN PATENT DOCUMENTS

WO    WO 03/100458    12/2003
WO    WO 2005/114253    12/2005

OTHER PUBLICATIONS

French Preliminary Report and Written Opinion dated Jun. 10, 2010 for Application No. FR0958152.

* cited by examiner

*Primary Examiner* — Thomas Tarcza
*Assistant Examiner* — Antoine J Bedard
(74) *Attorney, Agent, or Firm* — Frost Brown Todd LLC (57) ABSTRACT

A process for measuring speed or vibration characteristics using a LIDAR device allows the separation of a useful contribution and an interfering contribution in a backscattered signal. To this purpose, a phase characteristic of an optical wave emitted in the direction of a target volume is modulated. The interfering contribution, which originates from a source at a distance from the target volume, appears with variable shifts of said phase characteristic in a heterodyne detection signal. An accumulation then isolates the useful contribution, from which a result is obtained for the speed or vibration measurement. The process can be implemented with a frequency modulation or phase modulation of the optical wave.

23 Claims, 3 Drawing Sheets

MEASUREMENT OF SPEED OR VIBRATION CHARACTERISTICS USING A LIDAR DEVICE WITH HETERODYNE DETECTION

FIELD OF THE INVENTION

This invention relates to the measurement of speed or vibration characteristics using a LIDAR device with heterodyne detection, also called coherent LIDAR. It concerns a process as well as a device for performing such a measurement.

BACKGROUND OF THE INVENTION

LIDAR (Light Detection and Ranging) devices are widely used in numerous detection and measurement applications. Such applications include wind speed measurement, fluid flow analyses, the study of vibration phenomena, vehicle speed measurement, applications in the field of air transport, etc. Their operation consists in emitting a coherent optical wave in the direction of a target volume where an object or a phenomenon to be studied is located, and to collect a portion of this wave which is backscattered from the target volume. In a coherent LIDAR device, the collected portion of the scattered wave undergoes heterodyne detection. The speed measurement is determined from a Doppler shift which is measured in a signal of the heterodyne detection.

However, the scattered wave which is collected may originate not only from the object in the target volume which the LIDAR device is pointing towards, but also from objects outside the target volume which may also significantly scatter the optical wave. For example, for a wind speed measurement, the wave is scattered by the droplets or dust within the target volume which are carried along by the wind, but a cloud which is located beyond the target volume can cause much more optical scattering than the droplets and dust in the target volume. In this case, the presence of the cloud in the background, and possibly the motion of the cloud, can interfere with or prevent the detection of the portion of the wave which is scattered by the content of the target volume. A comparable situation occurs when measuring the flow of a fluid, and a wall in the background produces significant scattering or reflection of the wave emitted by the LIDAR device.

In LIDAR devices where the system for emitting the optical wave is separate from the system for receiving the backscattered wave, the target volume can be selected relative to the background. The two emitting and receiving systems are each oriented towards the target volume, with the target volume selected relative to the background at the intersection of the respective directions in which the emitting and receiving systems are pointing. Such LIDAR devices, known as bistatic LIDAR, require precise installation in order to select the desired target volume, with a sufficient distance separating the emitting and receiving systems. They are therefore poorly suited for use on board a vehicle or an aircraft, for example. Usually they are difficult to move because of their structure involving several separate parts. Bistatic LIDAR devices are also inappropriate for mapping speed measurements by varying the target volume within a much larger volume of analysis.

Monostatic LIDAR devices do not have these disadvantages, as they combine the wave emitting and receiving systems. They can easily be moved and used in vehicles and aircrafts. However, speed measurements obtained with such monostatic devices can be impeded and prevented by a backscattering element located in the direction in which the device is pointing, in front of or behind the target volume, even if the distance from the target volume is taken into account in the heterodyne detection.

In addition, a monostatic LIDAR device allows easily mapping speed measurements, by varying the direction the device is pointing in order to scan a field to be analyzed.

To select the useful portion of the heterodyne detection signal which contains the measurement information, and not the part of the same heterodyne detection signal which does not originate from the object of interest, it is known to repeat the acquisition of the heterodyne signal, separately analyze the heterodyne detection signals obtained at each repetition, and accumulate all the results from these analyses. Such accumulation usually consists in adding the results from the spectral analyses. This allows separating the measurement information concerning the object of interest when this information is constant, from the variable or incoherent background noise. Such processing does not distinguish between two objects situated in the pointing direction of the monostatic LIDAR, and which each have a substantially constant moving speed.

It is also known to perform a synchronous detection of the wave portion which is scattered, to distinguish it from contributions to the detected signal which are independent of the optical wave emitted.

Under these conditions, a first object of the invention is to provide speed measurements using a monostatic LIDAR device with heterodyne detection, which does not have the above disadvantages.

A second object of the invention is that such measurements can be performed using LIDAR devices existing before the invention, by easily and only slightly modifying such devices and their use.

In particular, the invention has the object of measuring speeds with an improved selectivity of the target volume relative to the foreground and background in the pointing direction of the device. Such improved selectivity is desirable for mapping measurements.

Another object of the invention is to enable measurements using a LIDAR device which takes up little space, and for which the weight is not significantly increased relative to existing devices.

SUMMARY OF THE INVENTION

To achieve these and other objects, the invention proposes a process for measuring a speed or vibration characteristic which uses a LIDAR device with heterodyne detection, wherein an optical wave signal is emitted from an optical head of the device in the direction of a target volume, and a backscattered signal is collected by the same optical head then is detected by heterodyne detection so as to produce a heterodyne detection signal. In other words, the LIDAR device which is used is a monostatic coherent LI DAR device.

The process additionally comprises the following steps for a measurement cycle:
/1/ producing a modulation of a phase characteristic of the optical wave in the emission signal, such as a frequency modulation or a phase modulation,
/2/ demodulating the heterodyne detection signal relative to the modulation of the phase characteristic, with compensating for a propagation delay of the emission signal and backscattered signal between the optical head of the device and the target volume,
/3/ combining a spectral analysis of the demodulated heterodyne detection signal with an accumulation over successive analysis time windows, so as to isolate a contribution to the heterodyne detection signal originating from the target volume, and /4/ obtaining a result for the velocimetric or vibrometric characteristic measurement, from a Doppler analysis of the contribution isolated in step /3/.

In addition, in a process according to the invention:

the modulation is obtained by shifting the phase characteristic of the optical wave during successive modulation time slots, by a fixed increment which is multiplied by factors q respectively assigned to the modulation time slots, the factors q are determined by one of the following two methods /i/ or /ii/, with only one of these methods used during the entire measurement cycle:

/i/ the factors q are equal to $b+a^p[n]$, where for this method /i/:

n is an integer greater than or equal to four, and is constant during the measurement cycle, a and b are two other integers, which are also constant during the measurement cycle, p is an exponent integer which is positive or zero and is strictly less than $\phi(n)$, where $\phi$ is Euler's totient function, and p has varying values which are respectively assigned to the modulation time slots, $a^p[n]$ indicates the $a^p$ modulo n reduction, and a is selected such that a[n] is not zero or one, /ii/ the factors q are equal to $d+c\cdot(p+1)\cdot p/2[n]$, where for this method /ii/:

n is an integer greater than or equal to four, and is constant during the measurement cycle, d and c are two integers, which are also constant during the measurement cycle, p is an integer factor of variation which is positive or zero, strictly less than n, and with varying values respectively assigned to the modulation time slots, $d+c\cdot(p+1)\cdot p/2[n]$ designates the $d+c\cdot(p+1)\cdot p/2$ modulo n reduction, and c is selected such that c[n] is not zero.

Euler's totient function $\phi$ is a function which associates with any strictly positive integer n, the number of strictly positive integers less than n and prime with n. This is therefore a function of the set of strictly positive integers with values in this same set of strictly positive integers. If n is a prime number, then $\phi(n)$ is equal to n−1. In general, any number n provides the following breakdown into prime factors: $n=\Pi p_i^{\wedge} k_i$, where the symbol $\Pi$ indicates the product of the prime numbers $p_i$ to the potency $k_i$, and the symbol ^ indicates the potency operation. Thus Euler's totient function has the value $\phi(n)=\Pi(p_i-1)p_i^{\wedge}(k_i-1)$.

When the phase characteristic which is shifted according to the invention is the frequency f of the optical wave of the emission signal, its shifts during the successive modulation time slots are $\Delta f=\Delta f_0 \times q$, where $\Delta f_0$ is the fixed frequency increment. Alternatively, when the invention is applied to the initial phase of the emission signal, $\Delta\phi=\Delta\phi_0 \times q$ are the shifts in the initial phase of the optical wave of the emission signal, with $\Delta\phi_0$ being the fixed increment of the initial phase.

A process of the invention has therefore the advantages provided by a monostatic LIDAR device with heterodyne detection.

It also has the advantages provided by the accumulation of analysis results or detection results, in particular for separating the information useful for measurement from the variable and incoherent noise which is also detected during the measurement cycle.

In addition, applying shifts which vary from one time slot to the next, to the phase characteristic of the optical wave, improves the spatial resolution in the pointing direction of the monostatic device. Typically, the invention produces a spatial resolution for measurements, along the pointing direction, which is of the order of $C \times T_{mod}/2$, where C is the propagation speed of the optical wave, and $T_{mod}$ is the individual duration of the modulation time slots corresponding to the successive factors q.

The invention is further improved in the ease of its implementation and/or its ability to improve the spatial resolution obtained, by the use of one or more of the following improvements, the first four of which are compatible with the two methods /i/ and /ii/ for determining factors q:

the factors q of the successive modulation time slots may form a sequence which is periodically repeated during the measurement cycle, the successive factors q may comprise at least three different values, and preferably at least one hundred different values, the number n may be a prime number, the number n may be the double of a prime number, particularly when the factors q are determined according to method /i/, when the factors q are determined according to method /i/, the integer a may be a primitive root of the quotient group (Z/nZ)* under multiplication, where Z is the ring of integers and * indicates that the zero value is excluded, the factors q then being $\phi(n)$ distinct values for p varying from 0 to $\phi(n)-1$, and when the factors q are determined according to method /ii/, the integer c may be a generator of a quotient group (Z/nZ) under addition, where Z is the ring of integers, the factors q then being n distinct values for p varying from 0 to n−1.

Particularly preferred implementations of the invention are obtained when n is a prime number of the order of several hundreds, and a is one of the primitive roots of the quotient group (Z/nZ)* under multiplication in method /i/.

In first embodiments of the invention, the phase characteristic of the optical wave which is shifted may be a frequency of this optical wave, so as to perform a frequency modulation. In this case, the individual duration of the modulation time slots is less than or equal to the individual duration of the analysis time windows. Step /3/ then comprises the following sub-steps:

/3-1/ performing a spectral analysis of the demodulated heterodyne detection signal within an analysis time window, in order to obtain a spectral analysis result for this time window, and /3-2/ repeating sub-step /3-1/ for several successive analysis time windows, and accumulating the spectral analysis results obtained for these time windows, with the contribution to the heterodyne detection signal originating fro m the target volume being predominant in t his accumulation.

In second embodiments of the invention, the phase characteristic of the optical wave which is shifted may be an initial phase of this optical wave, in order to perform a phase modulation.

In a first possibility for such a phase modulation, the individual duration of the modulation time slots may be less than or equal to the individual duration of the analysis time windows. In this case, step /3/ may comprise the following sub-steps:

/3-1/ performing a spectral analysis of the demodulated heterodyne detection signal within an analysis time window, in order to obtain a spectral analysis result for this time window, and /3-2/ repeating sub-step /3-1/ for several successive analysis time windows, and accumulating the spectral analysis results which have been obtained for these time windows, the contribution to the heterodyne detection signal which originates from the target volume being predominant in this accumulation.

In a second possibility for the phase modulation, the individual duration of the modulation time slots may be greater than or equal to the individual duration of the analysis time windows. In this case, step /3/ may comprise the following sub-steps:

/3-1/ accumulating segments of the demodulated heterodyne detection signal which correspond to successive analysis time windows, during successive modulation time slots, so that the contribution to the heterodyne detection signal which originates from the target volume are accumulated in a constructive manner, and /3-2/ performing a spectral analysis of a result of the accumulation.

In general, the invention is compatible with the use of a LIDAR device which is adapted to emit a continuous or pulsed signal.

The invention also proposes a LIDAR device with heterodyne detection, which is monostatic and is adapted to perform speed or vibration measurements, and which additionally comprises, unlike existing devices:

a phase modulator, which is arranged to modulate at least one source signal of the optical wave emission, a control unit, which is connected to a control input of the phase modulator and adapted to control the operation of this modulator to implement a process as described above, and means for compensating for a propagation delay of the emission signal and backscattered signal between the optical head and the target volume.

Such a LIDAR device of the invention can easily be obtained by appropriately modifying or programming a prior art device.

BRIEF DESCRIPTION OF THE FIGURES

Other features and advantages of the invention will be apparent from the following description of non-limiting implementation examples, with reference to the attached drawings in which.

DETAILED DESCRIPTION OF THE INVENTION

Figure 1A:
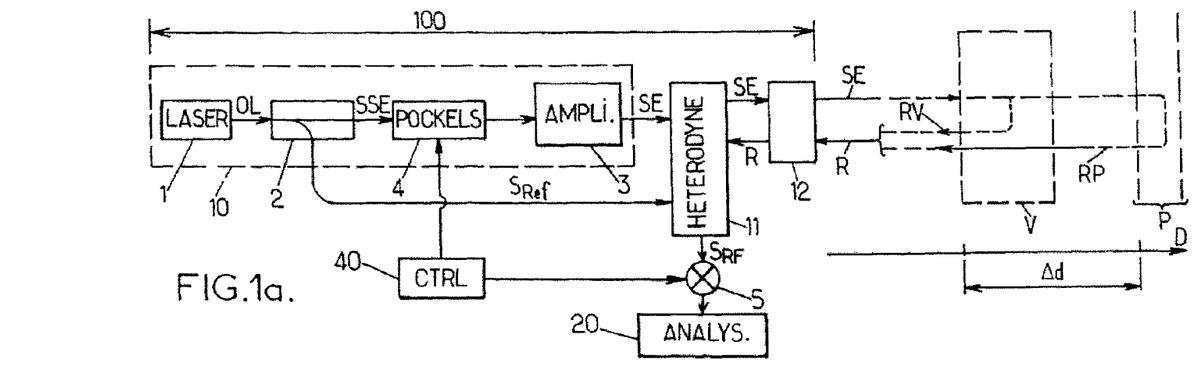
FIGS. 1a and 1b show two LIDAR device architectures with which the invention can be implemented.
Figure 1B:
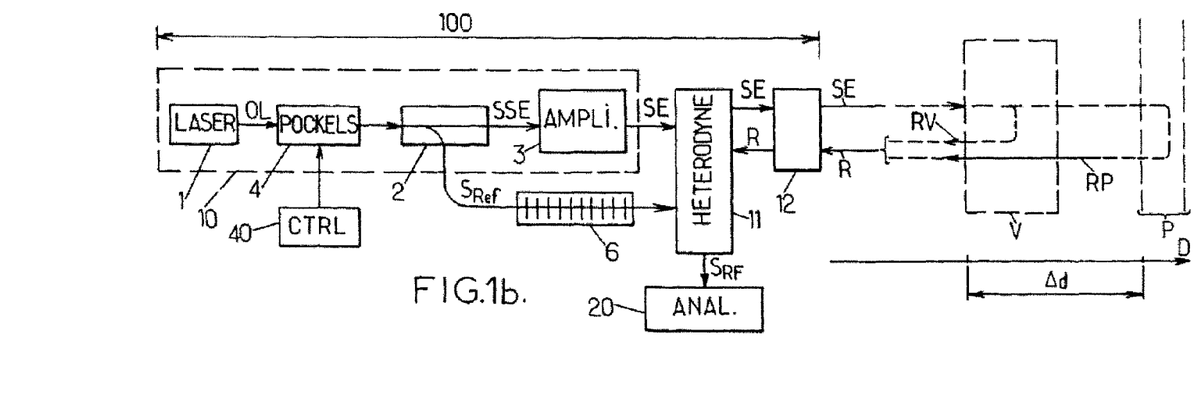

In FIGS. 1a and 1b, the same references denote identical elements or elements with identical functions. In addition, the following references denote the components indicated below, which are used in the same manner as in a known monostatic LIDAR device with heterodyne detection:

100: the LIDAR device with heterodyne detection,
1: a laser oscillator, adapted to produce an optical wave OL,
2: an optical splitter, which is arranged to split the optical wave OL into an emission source signal SSE and a reference signal $S_{Ref}$,
3: an optical amplifier, which is adapted to produce an emission signal SE from the emission source signal SSE,
11: a mixing and detection unit,
12: an optical head, adapted to transmit the emission signal SE in the direction of a target volume and to receive a backscattered signal R, and
20: analysis means.

In addition, D denotes a pointing direction of the device 100, which is selected by the orientation of the optical head 12. V is the target volume in which the object is located for which a speed or vibration characteristic is to be measured. The direction D is therefore oriented towards the target volume V.

An interfering source P of backscattering may be situated at any distance from the optical head 12 in the pointing direction D, beyond the target volume V or between the target volume V and the optical head 12. Under these conditions, the backscattered signal R which is collected by the optical head 12 comprises a first contribution RV which is produced by the object located in the target volume V, and at least one second contribution RP which is produced by the interfering source of backscattered P. In the following description, the contribution RV is called the useful contribution, and the contribution RP is called the interfering contribution.

The laser oscillator 1, the optical splitter 2, and the amplifier 3 may belong to a laser emission unit 10, which produces the emission signal SE. In a known and particularly advantageous manner, each of these components may be produced from at least one optical fiber which conducts the optical wave OL or the signals SSE, $S_{Ref}$ or SE. In the usual manner, the optical wave OL and the signals SSE, $S_{Ref}$ and SE belong to the infrared band of electromagnetic radiation, with a wavelength of between 1.535 µm and 1.565 µm (micrometers).

The mixing and detection unit 11 is adapted to transmit the emission signal SE to the optical head 12, and to produce a heterodyne detection signal $S_{RF}$ from the backscattered signal R which is received by the optical head 12 and from the reference signal $S_{ref}$.

The analysis means 20 are adapted to analyze the heterodyne detection signal $S_{RF}$. In a commonly used manner, these analysis means 20 divide the heterodyne detection signal $S_{RF}$ into signal segments within successive analysis time windows. They then perform a combination of spectral analysis and accumulation operations, as well as a Doppler effect analysis.

The device 100 may also comprise other components, as is customary for LIDAR devices with heterodyne detection. Such components are not discussed in the present description, as they are not directly related to the object of the invention.

In addition to the above components, a device 100 of the invention comprises:

a phase modulator 4, for modulating at least the emission source signal SSE, a control unit 40, for controlling an operation of the phase modulator 4, and means for compensating for a propagation delay of the emission signal SE and backscattered signal R between the optical head 12 and the target volume V.

The phase modulator 4 may comprise a Pockels cell. Such a Pockels cell produces a varying electrical field inside an active material which is adapted to modify the phase of an optical wave as a function of the electric field. Such phase modulators are also well known to a person skilled in the art.

Alternatively, the phase modulator 4 may comprise four Pockels cells arranged to form a Dual Parallel Mach-Zehnder modulator. Such modulators which modify both the phase and intensity of an optical wave are also known.

In the device 100 of FIG. 1a, the phase modulator 4 is arranged to receive as input the emission source signal SSE which is produced by the optical splitter 2, and to output the modulated emission source signal to the optical amplifier 3. In other words, the modulator 4 is located between the splitter 2 and the amplifier 3. In this first case, only the emission source signal SSE has the modulation produced by the modulator 4. The heterodyne detection signal $S_{RF}$ produced by the mixing and detection unit 11 is then demodulated before being sent to the analysis means 20. To this purpose, the device also comprises demodulation means 5 which are arranged for demodulating the heterodyne detection signal $S_{RF}$ in accordance with the operation of the phase modulator 4. The means of compensating for the propagation delay of the emission signal SE and the useful contribution RV are arranged to compensate for this delay during demodulation. In an advantageous embodiment, the demodulation means 5 may be digital and incorporate the means of compensating for the delay.

In the alternative device 100 of FIG. 1b, the phase modulator 4 is arranged to receive as input the optical wave OL produced by the laser oscillator 1, and to output this modulated optical wave to the optical splitter 2. In other words, the modulator 4 is located between the laser oscillator 1 and the splitter 2. In this second case, the emission source signal SSE and the reference signal $S_{Ref}$ are modulated in an identical manner. The means of compensating for the propagation delay in the emission signal SE and in the useful contribution RV are then arranged to delay the reference signal $S_{Ref}$ which is sent to the mixing and detection unit 11. For example, the means of compensating for the delay may comprise a delay line 6 which is placed on the line for transmitting the reference signal $S_{Ref}$, between the splitter 2 and the mixing and detection unit 11.

The two devices 100 of FIGS. 1a and 1b are equivalent with respect to the invention, so that all the implementations of the invention which are as described below can use either of these devices interchangeably. The device 100 of FIG. 1b is used in the rest of this description for illustrative purposes only.

A person skilled in the art also knows how to control the operation of the phase modulator 4 in order to create a frequency modulation or a phase modulation of the optical wave OL. Such person will only be reminded that the phase of an optical wave is of the form $2\pi \cdot f \cdot t + \phi$, where f and $\phi$ are respectively the frequency and the initial phase of the wave, and t is the time. The frequency modulation consists of varying the frequency f over time, and the phase modulation consists of varying the initial phase $\phi$ over time.

The modulation introduced according to the invention will now be described. First, the phase characteristic expression designates both the frequency f and the initial phase $\phi$.

The detection period of the backscattered signal R, for one measurement cycle, is divided into successive modulation time slots. This division into time slots is intended for the modulation of the emission source signal SSE. It is initially independent of the division of the same detection period into successive time windows for analysis of the heterodyne detection signal $S_{RF}$.

The modulation is produced by shifting the phase characteristic in a manner which is constant within each time slot, and which varies from one time slot to another. In the invention, this shift is a multiple of a fixed increment, per the following formula:

$$\Delta(C_{phase}) = \Delta(C_{phase})_0 \times q \qquad (1)$$

where $C_{phase}$ is the phase characteristic which is modulated, $\Delta(C_{phase})$ is the shift of this characteristic $C_{phase}$ within each modulation time slot, $\Delta(C_{phase})_0$ is the fixed increment, and q is the factor which is assigned to this time slot.

In addition, in a first alternative of the invention denoted by /i/, the factor q is given by the following formula:

$$q = b + a^p [n] \qquad (2)$$

where: n is an integer which is greater than or equal to four,
a and b are two other integers such that a[n] is not zero or one, and
p is exponent integer which is positive or zero and is strictly less than $\phi(n)$, $\phi$ being Euler's totient function.

The numbers n, a and b are constant for each measurement cycle. They may be set permanently by initially programming the control unit 40.

In this first alternative /i/, the exponent p assumes varying values for different time slots. Preferably, it may assume all integer values between 0 and $\phi(n)-1$, in any order for a series of successive time slots. However, it is preferred that these values of p: 0, then 1, then 2, . . . , up to $\phi(n)-1$, be in increasing order. It is possible for only a limited number of these values to be used for the exponent p. The factor q and the shift $\Delta(C_{phase})$ then vary accordingly. $b+a^p[n]$ denotes the $b+a^p$ modulo n reduction. In other words, the factor q of the shift $\Delta(C_{phase})$ of the phase characteristic is the remainder of an Euclidean division of $b+a^p$ by n. The value of the factor q for each time slot of the modulation is therefore itself a positive integer or zero.

In general, the integers a and b may be negative, but the integer a may be selected to be between one and n non-inclusive.

Mathematically, the successive values of the factor q, for this first alternative /i/ of the invention, are the elements of a subgroup of the quotient group $(Z/nZ)^*$ under multiplication.

In a second alternative of the invention denoted by /ii/, the factor q is given by the following formula:

$$q = d + c \cdot (p+1) \cdot p/2 \; [n] \qquad (2')$$

where: n is again an integer which is greater than or equal to four,
d and c are two other integers, with c such that c[n] is not zero, and
p is now an integer factor of variation which is positive or zero and is strictly less than n.

The numbers n, d and c are constant during each measurement cycle. They may also be set permanently by initially programming the control unit 40.

In this second alternative /ii/, the variation factor p again assumes values which vary for different time slots. Preferably, it may assume all the integer values from 0 to n−1 in any order for a series of successive time slots. However, it is preferred that these values of p: 0, then 1, then 2, . . . , up to n−1, be in increasing order. It is possible for only a limited number of these values to be used for the factor of variation p. The factor q and the shift $\Delta(C_{phase})$ therefore vary accordingly. $d+c \cdot (p+1) \cdot p/2[n]$ denotes the $d+c \cdot (p+1) \cdot p/2$ modulo n reduction. In other words, the factor q of the shift $\Delta(C_{phase})$ of the phase characteristic is the remainder of an Euclidean division of $d+c \cdot (p+1) \cdot p/2$ by n. The value of the factor q for each time slot of the modulation is therefore again a positive integer or zero.

In general, the integers d and c may be negative, but the integer c may be selected to be between zero and n non-inclusive.

Mathematically, the successive values of the factor q for this second alternative /ii/ of the invention are the elements of a sub-group of the quotient group (Z/nZ) under addition.

In general, a shift $\Delta(C_{phase})$ of the phase characteristic $C_{phase}$ which has been introduced into the emission signal SE, appears in the interfering contribution RP with a delay relative to the same shift $\Delta(C_{phase})$ in the useful contribution RV. This delay is due to the difference $\Delta d$ between the respective distances of the target volume V and the interfering source P, in the direction D. Conversely, the same shift $\Delta(C_{phase})$ appears first in the interfering contribution RP if the unwanted source P is situated between the device 100 and the target volume V. When the absolute value of the difference in the distances $\Delta d$ is greater than $C \times T_{mod}/2$, where C is the propagation speed for the emission signal SE and $T_{mod}$ is the individual duration of the modulation time slots, the interfering contribution RP and the reference signal $S_{Ref}$ have varying successive differences between them in the phase characteristic $C_{phase}$ during the heterodyne detection. There is a resulting spread in the values for the phase characteristic $C_{phase}$ relative to the interfering contribution RP, in the accumulation performed by the analysis means 20. Conversely, the propagation delay of the useful contribution RV is compensated for during the demodulation of the heterodyne detection signal $S_{RF}$ (FIG. 1a), or by the delay line 6 (FIG. 1b). The useful contribution RV therefore does not cause a varying shift in the phase characteristic $C_{phase}$ to appear in the analyzed heterodyne detection signal $S_{RF}$ during the entire measurement cycle. In this manner, the useful contribution RV becomes predominant in the accumulation performed by the analysis means 20 after a sufficient accumulation period. The useful contribution RV can thus be isolated in the backscattered signal R in order to determine the speed of the object(s) situated in the target volume V. This speed or speeds is (are) determined by a Doppler effect analysis in a manner that is well known to a person skilled in the art.

Preferably, when alternative /i/ of the invention is used, n is a sufficiently large prime number or double of a prime number, and a is a primitive root, also called a generator, of the quotient group $(Z/nZ)^*$ under multiplication, excluding the value of zero. In this case, the factor q may successively assume $\phi(n)$ values, where $\phi$ again indicates Euler's totient function, which are all different: $b+a^0[n]=b+1[n]$, $b+a^1[n]=b+a[n]$, $b+a^2[n]$, ..., $b+a^{n-2}[n]$. These values of q are then sufficiently numerous to produce an efficient spread for the interfering contribution RP. This spread may allow reducing the number of successive time slots during which the detection and analysis of the backscattered signal R are repeated in order to separate the useful contribution R from the interfering contribution RP. This separation is efficient even if the interfering contribution RP is much more intense than the useful contribution RV. For example, n may be equal to 173 and a may be equal to 11 or 17, or n may be equal to 317 and a may again be equal to 17.

In a similar manner when alternative /ii/ of the invention is used, n is again preferably a sufficiently large prime number, d is any integer, and c, which is chosen such that c[n] is not zero, is a generator of the quotient group (Z/nZ) under addition. In this case, the factor q may successively assume n values which are selected from among (n+1)/2 values all different. As before, these sufficiently numerous values for q produce a spread in the interfering contribution RP, and so again efficiently separate the useful contribution RV from the interfering contribution RP.

The figures presented in the rest of this description relate to an implementation of the invention according to the first alternative /i/. To provide a clear illustration of the principle of the invention, n is equal to 7, b is equal to 0, and a is equal to 3, 3 being a primitive root of the quotient group $(Z/7Z)^*$ under multiplication. The values of the exponent p and of the factor q form two sequences which are repeated with a period duration equal to $6 \times T_{mod}$.

In general, the duration $T_{mod}$ of the modulation time slots is chosen so that its inverse $1/T_{mod}$ belongs to the domain of radio frequencies (RF). The heterodyne detection performed by the mixing and detection unit 11 then comprises a RF demodulation step.

In the first implementation of the invention, which will now be described with reference to FIGS. 2a and 2b, the phase characteristic $C_{phase}$ which is modulated in the manner just described, is the frequency f. The invention introduces a frequency modulation for the optical wave of the emission signal SE. In this case, the relation (1) becomes:

$$\Delta f = \Delta f_0 \times q \quad (1')$$

where $\Delta f_0$ is a fixed frequency increment. For example, $\Delta f_0$ may be on the order of $10^{-8} \times f$, f being the frequency of the optical wave OL which is produced by the laser oscillator 1.

Figure 2A:
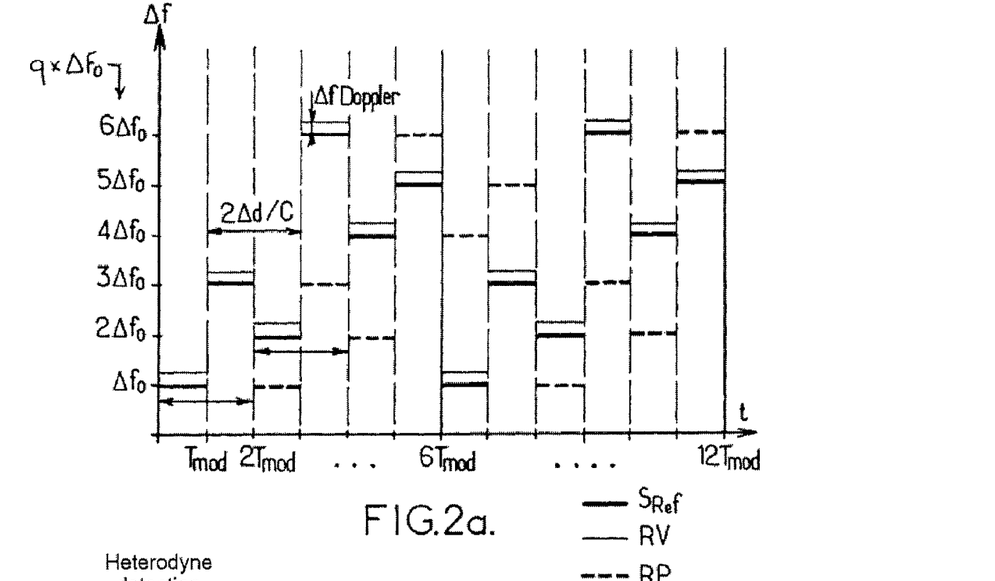
FIGS. 2a and 2b are two diagrams which show a result from analyzing a backscattered signal in a first implementation of the invention, and FIGS. 3a and 3b correspond to FIGS. 2a and 2b, but for a second implementation of the invention.

The diagram in FIG. 2a shows, as a function of time t, the respective shifts in the frequency of the reference signal $S_{Ref}$, the useful contribution RV to the backscattered signal R produced by the content of the target volume V, and the interfering contribution RP to the same backscattered signal R, such that these shifts are synchronized for heterodyne detection. The frequency of the useful contribution RV is modulated at each moment, as is that of the reference signal $S_{Ref}$, with a difference $\Delta f_{Doppler}$ relative to this latter due to the Doppler effect caused by the movement of the content of the target volume V. In contrast, the frequency of the interfering contribution RP is modulated similarly to the reference signal $S_{Ref}$, but with a delay that is equal to the additional propagation time for the interfering contribution RP. This additional propagation time is $2 \times \Delta d/C$, and for illustrative purposes is equal to $2 \cdot T_{mod}$ for FIGS. 2a and 2b. In addition, it is assumed for these figures that the unwanted contribution RP does not present a Doppler effect due to displacement of the interfering source P. However, such a displacement of the interfering source P does not change the efficiency of the invention in isolating the useful contribution RV.

Figure 2B:
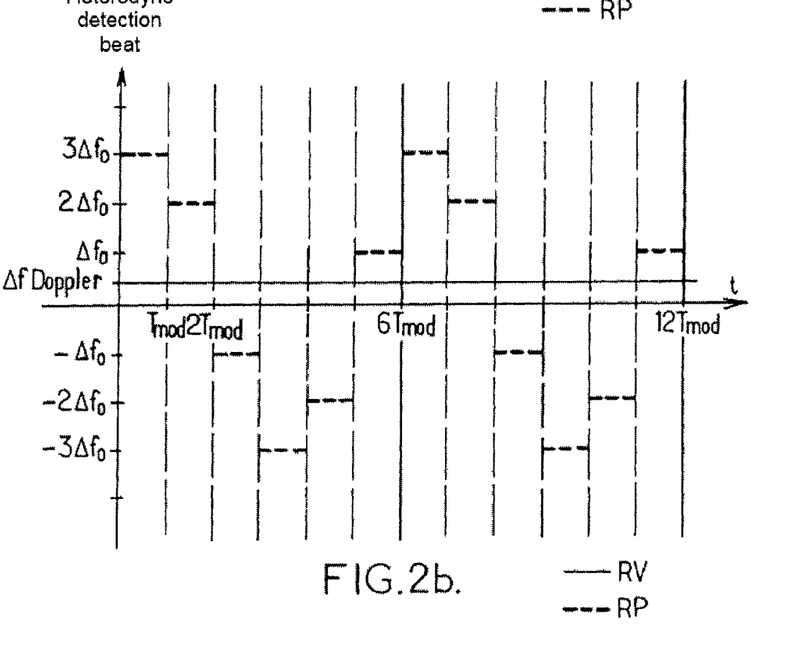

The diagram in FIG. 2b shows the beat frequencies which appear during heterodyne detection for the useful contribution RV and for the interfering contribution RP, as a function of time t. It corresponds to the frequency shifts $\Delta f$ indicated in FIG. 2a. These beat frequencies correspond to the difference at each moment between the respective frequencies of the useful contribution RV and the reference signal $S_{Ref}$, and between the respective frequencies of the interfering contribution RP and the reference signal $S_{Ref}$. They may be determined digitally. For the useful contribution RV, the beat frequency is constant for the entire duration of the measurement cycle, and is equal to $\Delta f_{Doppler}$. Because of the invention, the beat frequency for the interfering contribution RP assumes the values $-3 \times \Delta f_0$, $-2 \times \Delta f_0$, $-\Delta f_0$, $+\Delta f_0$, $+2 \times \Delta f_0$ and $+3 \times \Delta f_0$, in an order which depends on n, a, b, and on the order of the values of the exponent p. The order of the successive values for the beat frequency for the interfering contribution RP does not provide any measurement information. Thus, when spectral analysis is performed on the heterodyne detection signal $S_{RF}$, the interfering contribution RP is dispersed over the frequencies $-3 \times \Delta f_0$, $-2 \times \Delta f_0$, $-\Delta f_0$, $+\Delta f_0$, $+2 \times \Delta f_0$ and $+3 \times \Delta f_0$, while the useful contribution RV remains concentrated at $\Delta f_{Doppler}$. The amplitude of the latter therefore predominates in the accumulation result. It is isolated, then analyzed in the usual manner to obtain the result of the speed or vibration measurement.

This implementation of the invention by frequency modulation is particularly suitable for measuring wind speed. It may be used on board an aircraft, particularly for providing a reference measurement for the wind speed.

In particular, the wind speed may be measured at more than 400 m (meters) from the aircraft, so that the air flow in the target portion V to be measured is not disturbed by the travel of the aircraft itself. The individual duration $T_{mod}$ of the modulation time slots may then be between 0.2 µs (microseconds) and 10 µs. For example, $T_{mod}$ may be equal to 2 µs, which allows separating in the backscattered signal R the useful contribution that originates at a selected distance, and the interfering contributions which originate at other distances differing by more than 300 m from the distance selected.

In such a wind speed measurement application, the objects from which the useful contribution RV originate are dust or droplets within the target volume V. Their contribution RV to the backscattered signal R may then be considerably less intense than an interfering contribution RP from a cloud which is further away but is also in the pointing direction. With the invention, the useful contribution RV can still be separated and analyzed in order to calculate a precise measurement of the wind speed at the selected distance from the aircraft.

Figure 3A:
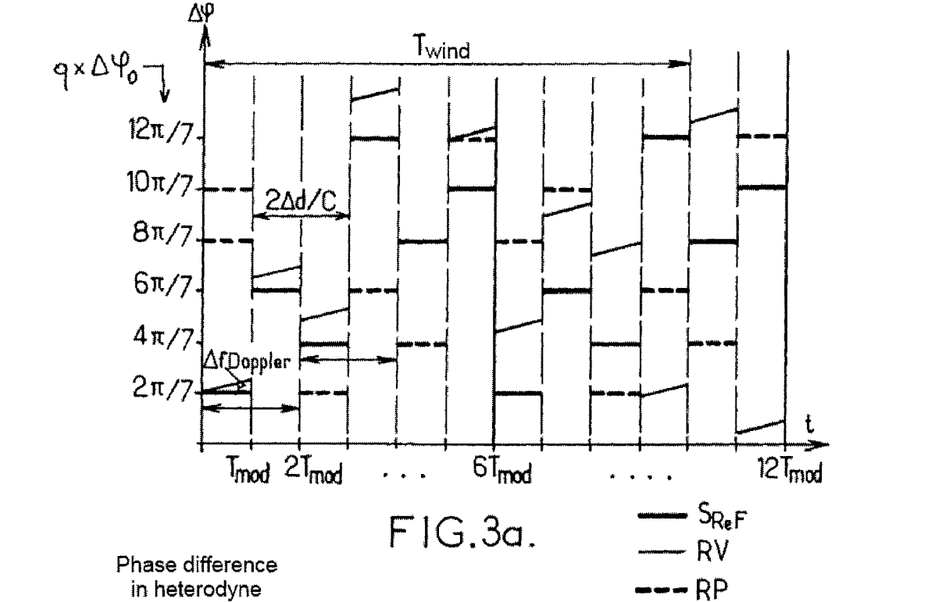
Figure 3B:
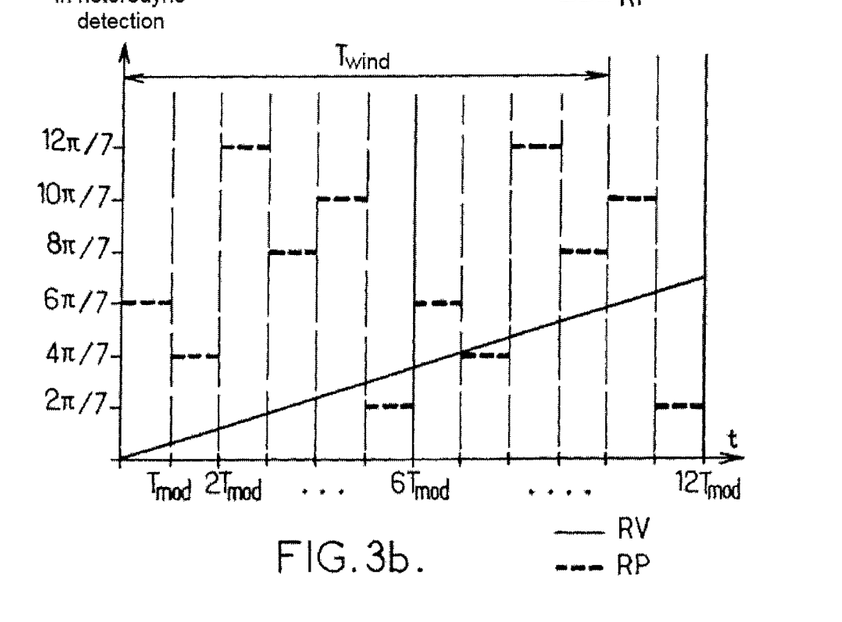

In the second implementations of the invention described below, the phase characteristic $C_{phase}$ which is modulated according to the invention is the initial phase ϕ. Thus the optical wave of the emission signal SE is phase modulated by the invention, and the relation (1) becomes:

$$\Delta\phi = \Delta\phi_0 \times q \quad (1'')$$

where $\Delta\phi_0$ is the initial phase fixed increment. Preferably, this fixed increment $\Delta\phi_0$ is equal to $2\cdot\pi/n$, so that the modulation produces a maximum spread for the interfering contribution RP.

FIGS. 3a and 3b are obtained in the same manner as FIGS. 2a and 2b, such that a person skilled in the art will understand the corresponding illustration of the invention without any need to repeat the method for obtaining these figures. Again, the duration of each time window for the analysis is longer than that of each modulation time slot, with this modulation now concerning the initial phase ϕ. The Doppler effect of the useful contribution RV now appears as a supplemental phase shift, which grows linearly and which is added to the shift Δϕ from the modulation of the initial phase for the useful contribution RV. $\Delta f_{Doppler}$ is then the slope of the variation in Δϕ within each modulation time slot. In order to obtain a constant measurement of the phase difference produced by the Doppler effect, particularly at the end of each time window of the analysis, it is preferable that the individual duration $T_{mod}$ of the modulation time slots be a divisor of the duration of the time window of the analysis, which is denoted $T_{wind}$. The heterodyne detection signal $S_{RF}$ is first demodulated relative to the initial phase jumps, then spectral analysis is performed. During this spectral analysis, the useful contribution RV is not attenuated, while the interfering contribution RP is combined in alternative /i/ of the invention with a squared sinc function, of a width equal to $1/T_{mod}$. Thus, this type of phase modulation again produces a spectral dispersion which is selective for the interfering contribution RP. The results of this spectral analysis for the successive time windows are accumulated to isolate the useful contribution RV, then the Doppler effect analysis provides the result of the speed or vibration measurement.

Such an implementation of the invention, using phase modulation, is particularly suitable for measuring flow velocities in the laboratory. It provides an efficient method for distinguishing, in the collected backscattered signal R, the contribution from the flow and a contribution from the reflection of the emission signal which is produced by a fixed wall in the background.

Lastly, in a variant of the phase modulation implementation of the invention, the individual duration $T_{mod}$ of the modulation time slots is greater than the individual duration $T_{wind}$ of the time window of the analysis. The heterodyne detection signal $S_{RF}$, demodulated relative to the initial phase jumps, is first partitioned into segments which correspond to the time windows. These segments are then accumulated, i.e. added to each other, for the entire duration of the measurement cycle. This accumulation is constructive for the useful contribution RV and destructive for the interfering contribution RP. Preferably, the individual duration $T_{mod}$ of the modulation time slots is a multiple of the individual duration $T_{wind}$ of the time window for the analysis. In other words, $T_{mod} = z \times T_{wind}$, where z is a strictly positive integer. The initial phase is then constant within each time window. In the case where the factors q are determined according to alternative /i/ of the invention, z is preferably equal to ϕ(n), where ϕ is Euler's totient function, and the accumulation of all the values of the initial phase ϕ for the interfering contribution RP has a modulus of 1, while the same accumulation for the useful contribution RV has a modulus of ϕ(n). In the other case where the scale factors q are determined according to alternative /ii/ of the invention, z is preferably equal to n and the accumulation of all the values of the initial phase ϕ for the interfering contribution RP is equal to 0, while the same accumulation for the useful contribution RV has a modulus of n. For this variant of the phase modulation implementation, the invention therefore produces an attenuation of the interfering contribution rather than a spectral dispersion of it. Spectral analysis then Doppler analysis are performed on the result of the accumulation, to obtain the result for the speed or vibration measurement.

It is understood that the invention may be applied by introducing adaptations to the implementations detailed above. In particular, the modulation introduced by the invention may be applied to an optical wave which is continuous as has been described, or to a wave produced as successive pulses. In addition, the invention may be used not only for measuring the velocity of the content of the target volume, but also for measuring other speed or vibration characteristics, such as velocity distribution width, vibration frequency, vibration amplitude, etc.

The invention claimed is:

1. Process for measuring a speed or vibration characteristic which uses a LIDAR device with heterodyne detection, wherein an optical wave emission signal is emitted from an optical head of said device in the direction of a target volume, and a backscattered signal is collected by said optical head then is detected by heterodyne detection so as to produce a heterodyne detection signal, said process comprising the following steps for a measurement cycle:

/1/ producing a modulation of a phase characteristic of the optical wave in the emission signal, /2/ demodulating the heterodyne detection signal relative to the modulation of the phase characteristic, with compensating for a propagation delay of the emission signal and backscattered signal between the optical head of the device and the target volume, /3/ combining a spectral analysis of the demodulated heterodyne detection signal with an accumulation over successive analysis time windows, so as to isolate a contribution to the heterodyne detection signal coming from the target volume, and /4/ obtaining a result for the speed or vibration characteristic measurement, from a Doppler analysis of the contribution isolated in step /3/, and wherein:

the modulation is obtained by shifting the phase characteristic of the optical wave during successive modulation time slots, by a fixed increment which is multiplied by factors q respectively assigned to said modulation time slots, the factors q are determined according to one of the two following methods /i/ or /ii/, with only one of said methods used during the entire measurement cycle:

/i/ the scale factors q are equal to $b+a^p[n]$, where for said method method /i/:

n is an integer greater than or equal to four, and is constant during the measurement cycle, a and b are two other integers, which are also constant during the measurement cycle, p is an exponent integer which is positive or zero and is strictly less than $\Phi(n)$, where $\Phi$ is a Euler's totient function, and p has varying values which are respectively assigned to the modulation time slots, $b+a^p[n]$ indicates the $b+a^p$ modulo n reduction, and a is selected such that a[n] is not zero or one, /ii/ the factors q are equal to $d+c\cdot(p+1)\cdot p/2\,[n]$, where for said method /ii/:

n is an integer greater than or equal to four, and is constant during the measurement cycle, d and c are two integers, which are also constant during the measurement cycle, p is an integer factor of variation which is positive or zero, strictly less than n, and with varying values respectively assigned to the modulation time slots, $d+c\cdot(p+1)\cdot p/2\,[n]$ designates the $d+c\cdot(p+1)\cdot p/2$ modulo n reduction, and c is selected such that c[n] is not zero.

2. Process according to claim 1, wherein the factors q of the successive modulation time slots form a sequence which is periodically repeated during the measurement cycle.

3. Process according to claim 1, wherein the successive factors q comprise at least three different values.

4. Process according to claim 3, wherein the successive factors q comprise at least one hundred different values.

5. Process according to claim 1, wherein the number n is prime.

6. Process according to claim 1, wherein the number n is the double of a prime number.

7. Process according to claim 5, wherein the factors q are determined according to method /i/, and wherein the integer a is a primitive root of a quotient group (Z/nZ)* under multiplication, where Z is the ring of integers and * indicates that the zero value is excluded, the factors q being $\Phi(n)$ distinct values for p varying from 0 to $\Phi(n)-1$.

8. Process according to claim 5, wherein the factors q are determined according to method /ii/, and wherein the integer c is a generator of a quotient group (Z/nZ) under addition, where Z is the ring of integers, the factors q being selected from among (n+1)/2 distinct values for p varying from 0 to n−1.

9. Process according to claim 1, wherein the phase characteristic of the optical wave which is shifted is a frequency of said optical wave, so as to perform a frequency modulation, and wherein an individual duration of the modulation time slots is less than or equal to an individual duration of the analysis time windows, with step /3/ comprising the following sub-steps:

/3-1/ performing a spectral analysis of the demodulated heterodyne detection signal within an analysis time window, in order to obtain a spectral analysis result for said time window, and /3-2/ repeating sub-step /3-1/ for several successive analysis time windows, and accumulating the spectral analysis results respectively obtained for said time windows, with the contribution to the heterodyne detection signal originating from the target volume being predominant in the accumulation.

10. Process according to claim 9, used to measure a wind speed.

11. Process according to claim 9, wherein the individual duration of the modulation time slots is between 0.2 μs and 10 μs.

12. Process according to claim 9, implemented on board an aircraft.

13. Process according to claim 1, wherein the phase characteristic of the optical wave which is shifted is an initial phase of said optical wave, so as to perform a phase modulation.

14. Process according to claim 13, wherein the fixed increment of the initial phase of the optical wave is equal to $2\cdot\pi/n$.

15. Process according to claim 13, wherein an individual duration of the modulation time slots is less than or equal to an individual duration of the analysis time windows, with step /3/ comprising the following sub-steps:

/3-1/ performing a spectral analysis of the demodulated heterodyne detection signal within an analysis time window, in order to obtain a spectral analysis result for said time window, and /3-2/ repeating sub-step /3-1/ for several successive analysis time windows, and accumulating the spectral analysis results respectively obtained for said time windows, with the contribution to the heterodyne detection signal originating from the target volume being predominant in the accumulation.

16. Process according to claim 15, wherein the individual duration of the modulation time slots is a divisor of the individual duration of the analysis time windows.

17. Process according to claim 13, wherein an individual duration of the modulation time slots is greater than or equal to an individual duration of the analysis time windows, with step /3/ comprising the following sub-steps:

/3-1/ accumulating segments of the demodulated heterodyne detection signal which correspond to successive analysis time windows, during the successive modulation time slots, so that the contribution to the heterodyne detection signal originating from the target volume is accumulated in a constructive manner, and /3-2/ performing a spectral analysis of a result of the accumulation.

18. Process according to claim 17, wherein the individual duration of the modulation time slots is a multiple of the individual duration of the analysis time windows.

19. LIDAR device adapted to perform speed or vibration measurements, and comprising:

a laser oscillator, adapted to produce an optical wave, an optical splitter, arranged to split the optical wave into an emission source signal and a reference signal, an optical amplifier, adapted to produce an emission signal from the emission source signal, an optical head, adapted to transmit the emission signal in the direction of a target volume and to receive a back-scattered signal, a mixing and detection unit, adapted to transmit the emission signal to the optical head, and to produce a heterodyne detection signal from the backscattered signal received by said optical head and from the reference signal, and analysis means for analyzing the heterodyne detection signal, adapted to combine a spectral analysis of said heterodyne detection signal with an accumulation for successive analysis time windows, and to perform a Doppler analysis, with the device additionally comprising:

a phase modulator arranged to modulate at least the emission source signal, a control unit, connected to a control input of the phase modulator and adapted to control an operation of said phase modulator to implement a process according to claim 1, and means for compensating for a propagation delay of the emission signal and backscattered signal between the optical head and the target volume.

20. Device according to claim 19, wherein the phase modulator comprises a Pockels cell, or four Pockels cells arranged to form a Dual Parallel Mach-Zehnder modulator.

21. Device according to claim 19, wherein the phase modulator is arranged to receive as input the emission source signal produced by the optical splitter, and to output said emission source signal modulated to the optical amplifier, with the device additionally comprising demodulation means arranged for demodulating the heterodyne detection signal in accordance with the operation of the phase modulator, the delay compensation means being arranged to compensate for the propagation delay in the emission signal and in the backscattered signal during demodulation.

22. Device according to claim 19, wherein the phase modulator is arranged to receive as input the optical wave produced by the laser oscillator, and to output said optical wave modulated to the optical splitter, so that the emission source signal and the reference signal are modulated in an identical manner, the delay compensation means being arranged to delay the reference signal sent to the mixing and detection unit.

23. Process according to claim 6, wherein the factors q are determined according to method /i/, and wherein the integer a is a primitive root of a quotient group $(Z/nZ)^*$ under multiplication, where Z is the ring of integers and * indicates that the zero value is excluded, the factors q being $\Phi(n)$ distinct values for p varying from 0 to $\Phi(n)-1$.

* * * * *